UNITED STATES PATENT OFFICE.

JAMES R. CAMPBELL, OF SCOTTDALE, PENNSYLVANIA.

REFRACTORY MATERIAL.

1,114,446. Specification of Letters Patent. Patented Oct. 20, 1914.

No Drawing. Application filed February 6, 1914. Serial No. 817,043.

*To all whom it may concern:*

Be it known that I, JAMES R. CAMPBELL, a citizen of the United States, residing at Scottdale, in the county of Westmoreland and State of Pennsylvania, have invented certain new and useful Improvements in Refractory Materials, of which the following is a specification.

My invention is a new composition of matter, which is composed of calcined flint clay, and asbestos fiber, mixed and ground in a wet pan, preferably with small amounts of plastic clay, into a plastic mass and which is adapted for use in forming and in repairing the refractory linings of doors for coke ovens, retorts and metallurgical furnaces. A composition which has been found to give excellent results is:

Calcined flint clay __ 80 to 99.5 per cent.
Asbestos fiber _____ .5 to 10. per cent.

Sufficient plastic clay to make 100 per cent.

In making my improved refractory lining materials the amount of each of the several ingredients used may vary somewhat, within the following range of proportions:

Calcined flint clay ___ 80. to 99.5 per cent.
Plastic clay _____ Up to 15. per cent.
Asbestos fiber _____ .5 to 10. per cent.

The amount of each ingredient preferably used is:

Calcined flint clay _____ 85. per cent.
Plastic clay _____ 14.5 per cent.
Asbestos fiber _____ .5 per cent.

Total _____ 100 per cent.

The calcined flint clay reduces the amount of shrinkage in drying the plastic mass while the asbestos fiber makes a dependable binder for the mass. The addition of plastic clay lessens the time required to grind the calcined clay so that it will bond itself, this time being increased with a reduction in the amount of plastic clay used. In preparing my improved refractory lining material old fire clay brick may be and preferably is used to form the calcined flint clay in the mixture, but when a supply of old fire clay brick is not available, new flint clay, at the expense of a slight increase in cost, may be employed.

In using the material, it is put in place in the door frame or other location to which it is applied while plastic and is then dried.

I claim:

1. A refractory lining material consisting of a wet mixture of 85 per cent. calcined flint clay, 14.5 per cent. plastic clay and .5 per cent. asbestos fiber.

2. A refractory lining material containing at least 80 per cent. calcined flint clay, up to 15 per cent. plastic clay and .5 to 10 per cent. asbestos fiber.

In testimony whereof, I have hereunto set my hand.

JAMES R. CAMPBELL.

Witnesses:
JESSIE S. COOK,
G. F. KELLY.